(12) United States Patent
Chen et al.

(10) Patent No.: US 10,790,630 B2
(45) Date of Patent: Sep. 29, 2020

(54) UNIVERSAL SERIES BUS CONNECTOR AND MANUFACTURING METHOD THEREOF

(71) Applicant: PHISON ELECTRONICS CORP., Miaoli (TW)

(72) Inventors: Chin-Yuan Chen, Taipei (TW); Hung-I Chung, Hsinchu County (TW); Chun-Feng Lee, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 302 days.

(21) Appl. No.: 16/036,945

(22) Filed: Jul. 17, 2018

(65) Prior Publication Data

US 2018/0323566 A1    Nov. 8, 2018

Related U.S. Application Data

(62) Division of application No. 14/724,814, filed on May 29, 2015, now Pat. No. 10,177,518, which is a
(Continued)

(30) Foreign Application Priority Data

Dec. 27, 2012  (TW) .............................. 101150642 A (51) Int. Cl.
| | |
|---|---|
| *H01R 43/24* | (2006.01) |
| *H01R 43/20* | (2006.01) |
| *B29C 45/14* | (2006.01) |
| *H01R 13/6471* | (2011.01) |
| *H01R 43/16* | (2006.01) |

(52) U.S. Cl.
CPC ............. *H01R 43/24* (2013.01); *B29C 45/14* (2013.01); *B29C 45/14065* (2013.01); *B29C 45/14467* (2013.01); *H01R 13/6471* (2013.01); *H01R 43/16* (2013.01); *H01R 43/20* (2013.01); *B29C 2045/1454* (2013.01); *Y10T 29/4922* (2015.01); *Y10T 29/49208* (2015.01)

(58) Field of Classification Search
CPC combination set(s) only.
See application file for complete search history.

(56) References Cited

U.S. PATENT DOCUMENTS

| | | | | |
|---|---|---|---|---|
| 7,909,653 | B1 * | 3/2011 | Wan ..................... | H01R 13/514 439/660 |
| 2010/0159751 | A1 * | 6/2010 | Chiu ..................... | H01R 24/62 439/660 |

(Continued)

*Primary Examiner* — Truc T Nguyen
(74) *Attorney, Agent, or Firm* — JCIPRNET (57) ABSTRACT

A universal series bus (USB) connector including a base, a first terminal set, and a second terminal set and a method of manufacturing the universal series bus connector are provided. The first terminal set includes a pair of first differential signal terminals and a pair of second differential signal terminals, and terminals of the pair of first differential signal terminals are adjacent to each other and terminals of the pair of second differential signal terminals are adjacent to each other. Two of terminals of the second terminal set are located at two opposite sides of the pair of first differential signal terminals, and another two of the terminals of the second terminal set are located at two opposite sides of the pair of second differential signal terminals.

14 Claims, 6 Drawing Sheets

Related U.S. Application Data division of application No. 13/756,552, filed on Feb. 1, 2013, now Pat. No. 9,083,134.

(56) References Cited

U.S. PATENT DOCUMENTS

| | | | | |
|---|---|---|---|---|
| 2010/0173529 A1* | 7/2010 | He | H01R 13/6471 | 439/660 |
| 2010/0203768 A1* | 8/2010 | Kondo | H01R 27/00 | 439/676 |
| 2010/0248552 A1* | 9/2010 | He | H01R 13/516 | 439/638 |
| 2010/0254662 A1* | 10/2010 | He | H01R 13/6471 | 385/75 |
| 2011/0269322 A1* | 11/2011 | He | H01R 12/721 | 439/78 |
| 2012/0009818 A1* | 1/2012 | Yao | H01R 24/62 | 439/607.23 |
| 2012/0045934 A1* | 2/2012 | Wu | H01R 43/24 | 439/607.01 |
| 2013/0065450 A1* | 3/2013 | Su | H05K 3/4015 | 439/660 |
| 2013/0115822 A1* | 5/2013 | Pan | H01R 12/00 | 439/660 |
| 2013/0178106 A1* | 7/2013 | Hsueh | H01R 13/6592 | 439/626 |
| 2013/0244494 A1* | 9/2013 | Tziviskos | H01R 13/405 | 439/676 |
| 2013/0267125 A1* | 10/2013 | Tai | H01R 12/57 | 439/660 |
| 2013/0323985 A1* | 12/2013 | Tai | H01R 13/405 | 439/660 |
| 2016/0172802 A1* | 6/2016 | Wang | H01R 13/6471 | 439/676 |

\* cited by examiner

UNIVERSAL SERIES BUS CONNECTOR AND MANUFACTURING METHOD THEREOF

CROSS-REFERENCE TO RELATED APPLICATION

This application is a divisional application of and claims priority benefit of U.S. application Ser. No. 14/724,814, filed on May 29, 2015, now pending. The prior U.S. application Ser. No. 14/724,814 is a divisional application of and claims the priority benefit of U.S. application Ser. No. 13/756,552, filed on Feb. 1, 2013, U.S. Pat. No. 9,083,134, which claims the priority benefit of Taiwan application serial no. 101150642, filed on Dec. 27, 2012. The entirety of each of the above-mentioned patent applications is hereby incorporated by reference herein and made a part of specification.

BACKGROUND

Technology Field

The present invention is directed to a connector, and more particularly to a universal series bus connector.

Description of Related Art

The universal series bus is a popular interface for computer peripherals to connect to each other. The standard was updated from USB 1.0/1.1 to USB 2.0 and then updated from USB 2.0 to USB 3.0. The USB 3.0 is a signal transmission standard developed from the USB 2.0. The maximum speed of the USB 3.0 is 5 gigabytes/s, but that of the USB 2.0 is only 480 megabytes/s. Currently, an electric connector based on the USB 3.0 is compatible with an electric connector based on the USB 2.0. That is, the electric connector based the USB 3.0 is equipped with the same structure of the electric connector based on the USB 2.0 and additionally is configured with a plurality of pins providing functions for the USB 3.0.

Accordingly, the speed and frequency of pins of a bus may be enhanced through the updating of the transmission interface, but how to overcome a crosstalk effective occurred due to the high speed and high frequency of the electric connector based the USB 3.0, which is compliable with the electric connector based on the USB 2.0, is one of major issues in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a universal series bus connector and a manufacturing method thereof, which have a better capability for reducing interferences and suppressing electromagnetic waves.

In an exemplary embodiment of the present invention, a universal series bus (USB) connector is provided, wherein the USB connector includes a base, and a first terminal set and a second terminal set disposed on the base. The first terminal set includes a pair of first differential signal terminals and a pair of second differential signal terminals, and terminals of the pair of first differential signal terminals are adjacent to each other and terminals of the pair of second differential signal terminals are adjacent to each other. Two of terminals of the second terminal set are located at two opposite sides of the pair of first differential signal terminals, and another two of the terminals of the second terminal set are located at two opposite sides of the pair of second differential signal terminals.

In an exemplary embodiment of the present invention, a method for manufacturing a universal series bus (USB) connector is provided, wherein the method includes forming a first terminal set and a second terminal set by a punching process; arranging the first terminal set and the second terminal set such that terminals of a pair of first differential signal terminals are adjacent to each other, terminals of a pair of second differential signal terminals are adjacent to each other, two of terminals of the second terminal set are located at two opposite sides of the pair of first differential signal terminals, and another two of the terminals of the second terminal set are located at two opposite sides of the pair of second differential signal terminals; and injecting and forming a base for covering and carrying the first terminal set and the second terminal set.

As described above, in the exemplary embodiments of the present invention, the first differential signal terminals of the first terminal set are adjacent to each other, and the second differential signal terminals are adjacent to each other, the terminals of the second terminal set pass from the left side and the right side of the first different signal terminals and from the left side and the right side of the second different signal terminals. Therefore, the coupling level between the first differential signal terminals (and the second differential signal terminals) may be increased, thereby enhancing the transmission efficiency of different signals, suppressing electromagnetic interferences and reducing external crosstalk interferences.

In order to make the aforementioned and other features and advantages of the present invention more comprehensible, several embodiments accompanied with figures are described in detail below.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

DESCRIPTION OF EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one," "one or more," and "and/or" are open-ended expressions that are both conjunctive and disjunctive in operation. For example, each of the expressions "at least on of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Figure 1:
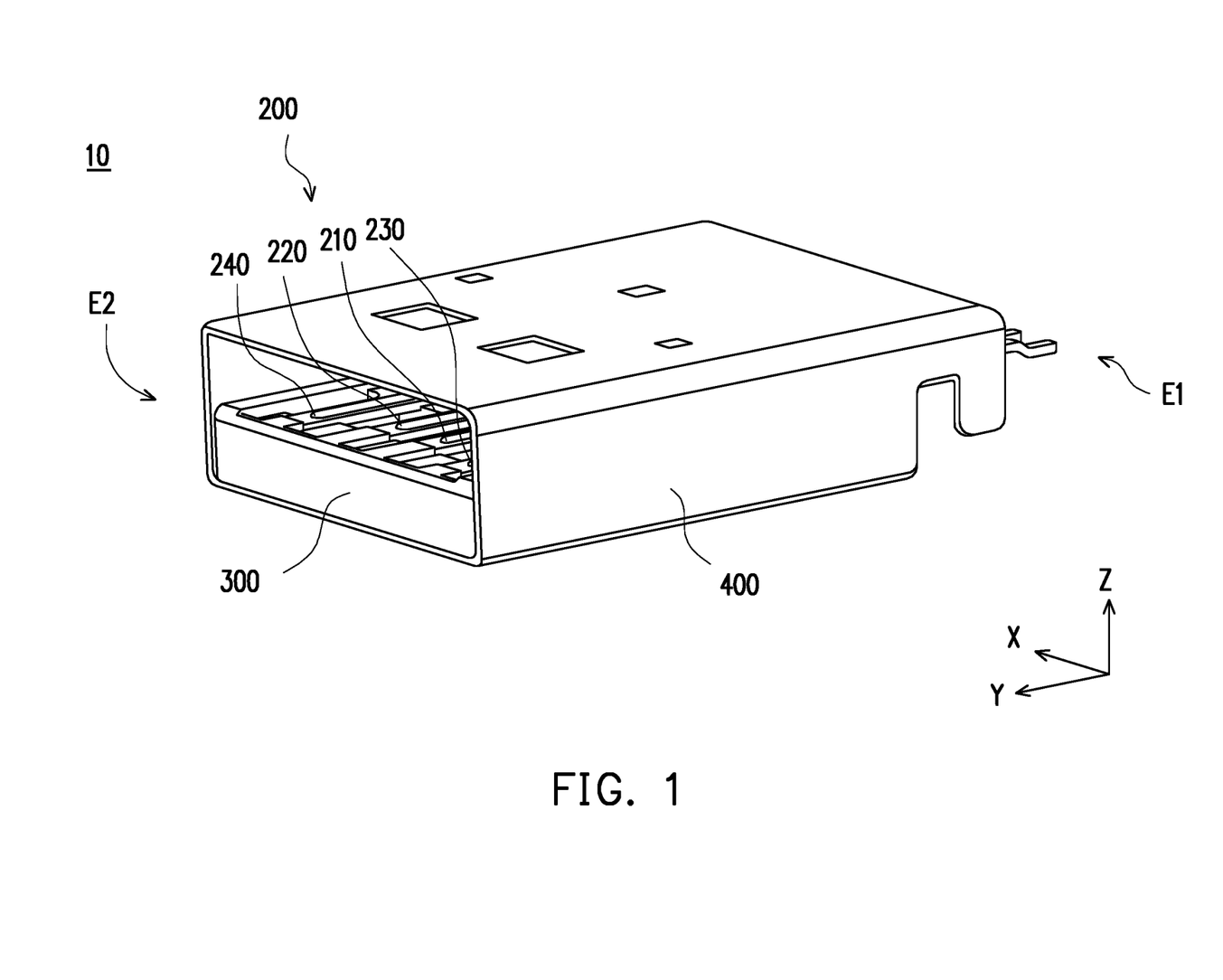
FIG. 1 is a diagram of a USB connector in accordance with the first exemplary embodiment of the present invention.
Figure 2:
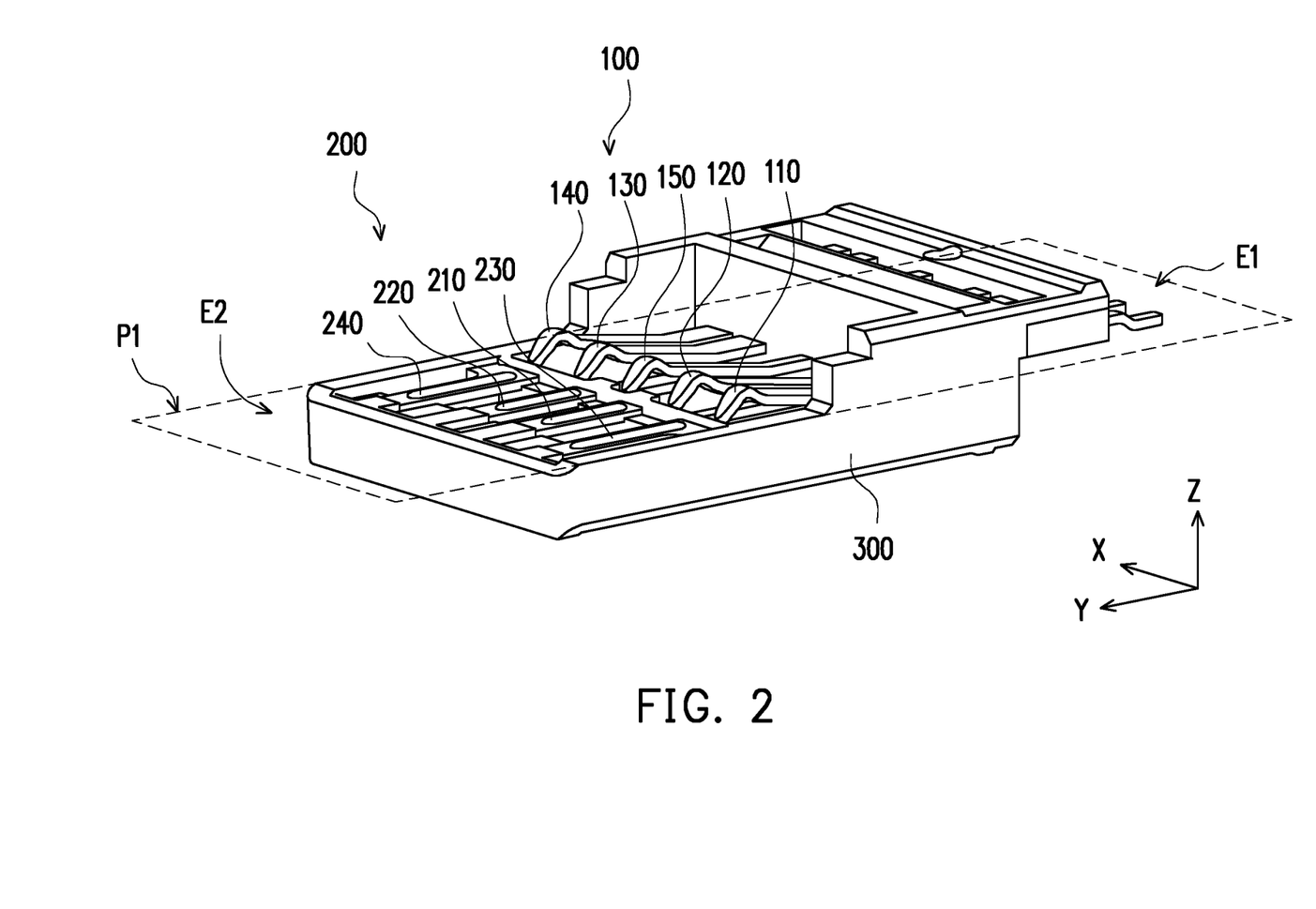
FIG. 2 is a diagram of internal components inside the USB connector depicted in FIG. 1.

FIG. 1 is a diagram of a USB connector in accordance with the first exemplary embodiment of the present invention. FIG. 2 is a diagram of internal components inside the USB connector depicted in FIG. 1. Additionally, to clearly explain the present invention, a coordinate system constructed by an x-axis, a y-axis, and z-axis is added in the drawings of the present invention for references.

Referring to FIG. 1 and FIG. 2, in the present exemplary embodiment, a universal series bus (USB) connector 10 is an electric connector based on the USB 3.0 standard and includes a first terminal set 100, a second terminal set 200, a base 300 and a housing 400. Herein, the first terminal set 100 and the second terminal set 200 are bound to the base 300 with an arrangement paralleling to the X-Y plane, and the housing 400 are disposed around the base 300 as a protection structure of the first terminal set 100 and the second terminal set 200 for shielding noises when the housing 400 is connected to the ground.

For example, the terminals of the first terminal set 100 and the terminals of the second terminal set 200 first are formed by punching once, wherein the punched first terminal set 100 and the punched second terminal set 200 respectively have height differences structures. Then, the first terminal set 100 and the second terminal set 200 are arranged and then plastics are injected with an in-mold injection manner to cover a partial of the foregoing terminals to form the base 300, wherein a portion of the first terminal set 100 located within the base 300 and a portion of the second terminal set 200 located within the base 300 have height differences. Finally, the housing 400 made by metal is jointed around the base 300, thereby completing the manufacture of the USB connector 10. It should be noted the present invention is not limited to the above-mentioned method for manufacturing the USB connector 10. Other processes for forming the foregoing structure may be applied in the present invention.

Additionally, USB connector 10 has a first end E1 and a second end E2 (i.e., a portion of the above-mentioned terminals which are exposed from the base 300), wherein the first end E1 is used for connecting to a storage unit or a transmission unit and the second end E2 is used for detachably connecting to an external device. In the present exemplary embodiment, a plug structure is taken as an example, but the present invention is not limited to. That is, configuration structures which are the same as that of the exemplary embodiment may be applied in the present invention.

Figure 3:
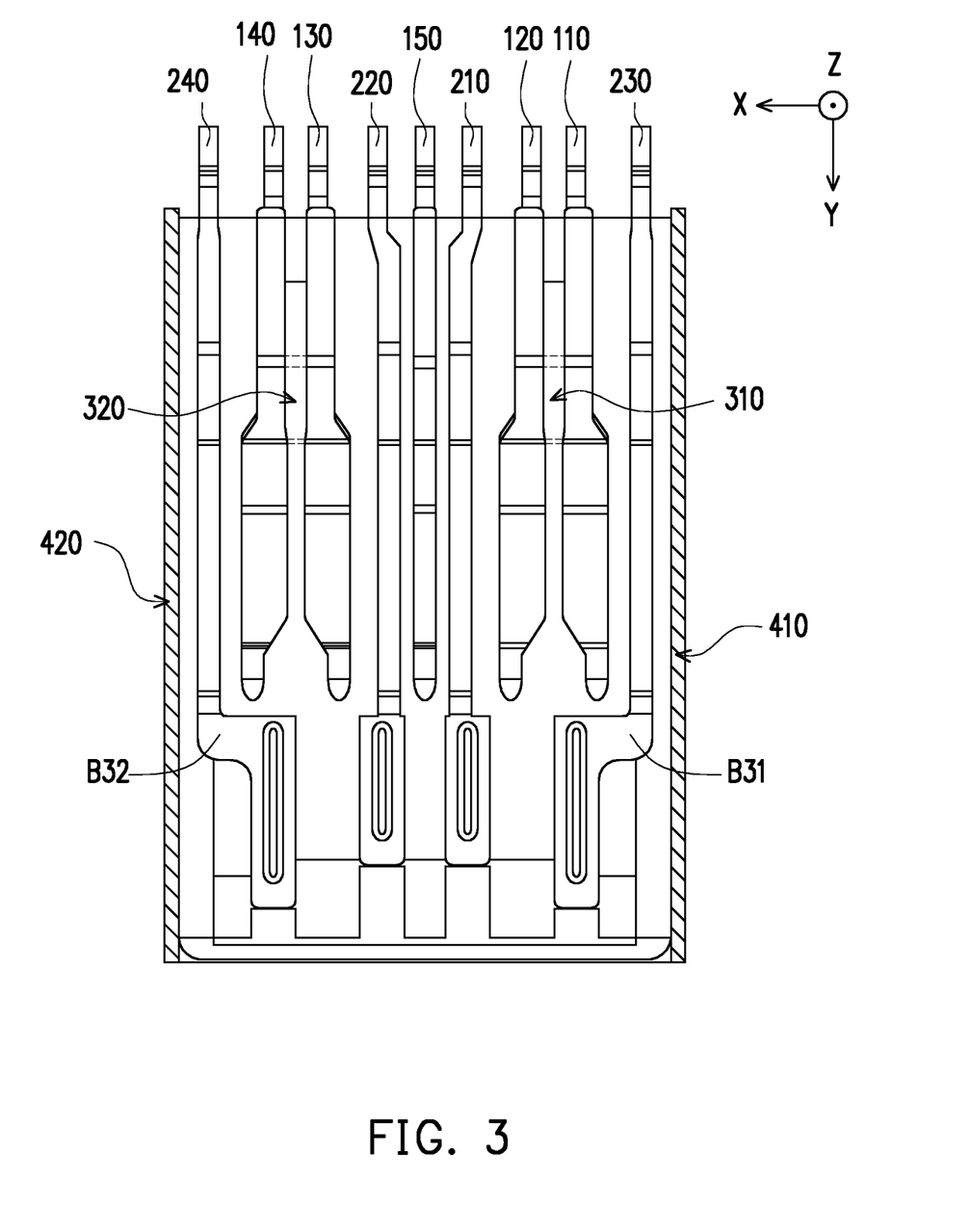
FIG. 3 is a top and cross sectional view of the USB connector depicted in FIG. 1.
Figure 4:
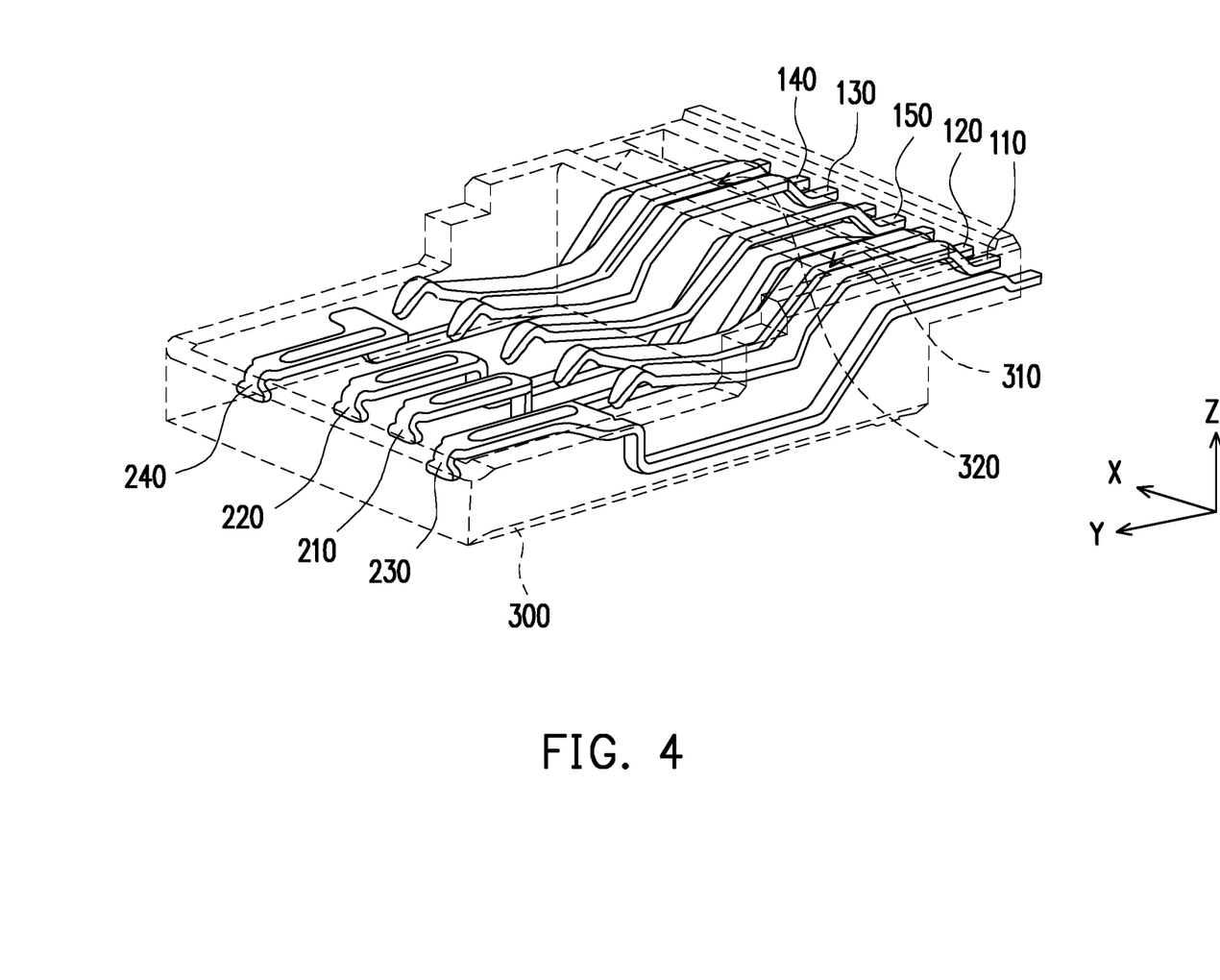
FIG. 4 is a diagram of partial components of the USB connector depicted in FIG. 2.

FIG. 3 is a top and cross sectional view of the USB connector depicted in FIG. 1. FIG. 4 is a diagram of partial components of the USB connector depicted in FIG. 2, and the base 300 is shown with dotted lines in FIG. 4. Referring to FIG. 2 to FIG. 4, in the present exemplary embodiment, the second terminal set 200 is a terminal set based on the USB 2.0 standard. That is, the USB connector 10 is formed by adding the first terminal set 100 into a structure having the second terminal set 200 (i.e., the terminal set based on the USB 2.0 standard).

In details, the first terminal set includes a pair of first differential signal terminals 110 and 120, which are adjacent to each other, a pair of second differential signal terminals 130 and 140, which are adjacent to each other, and a first ground terminal 150. In the present exemplary embodiment, the pair of first differential signal terminals 110 and 120 is a receiver differential pair (RX+/RX−) and the pair of second differential signal terminals 130 and 140 is a transmitter differential pair (TX+/TX−), which are used for the high-speed signal transmission of the USB 3.0. It should be noted that the modes of the first differential signal terminals 110 and 120 and the second differential signal terminals 130 and 140 are not limited to. In another exemplary embodiment, the pair of first differential signal terminals may be a transmitter differential pair, and the pair of second differential signal terminals may be a receiver differential pair.

The second terminal set 200 includes a pair of third differential signal terminals 210 and 220, a power terminal 230 and a second ground terminal 240, wherein the first differential signal terminals 110 and 120 are adjacent to each other, and the power terminal 230 and the third differential signal terminal 210 of the second terminal set 200 are located respectively at the two opposite sides of the first differential signal terminals 110 and 120. Furthermore, the second differential signal terminals 130 and 140 are adjacent to each other, and the second ground terminal 240 and the third differential signal terminal 220 of the second terminal set 200 are located respectively at the two opposite sides of the second differential signal terminals 130 and 140.

Therefore, only a wall structure 310 of the base 300 is used as an insulating structure between the pair of first differential signal terminals 110 and 120, and there is no other terminals therebetween. Similarly, only a wall structure 320 of the base 300 is used as an insulating structure between the pair of second differential signal terminals 130 and 140, and there is no other terminals therebetween. Accordingly, as shown in FIG. 3, two of terminals of the second terminal set 200 pass through the left and right sides of the pair of first differential signal terminals 110 and 120 and another two of the terminals of the second terminal set 200 pass through the left and right sides of the pair of second differential signal terminals 130 and 140, and therefore the crosstalk interferences generated between the second terminal set 200 and the first terminal set 100 can be reduced.

Referring to FIG. 2 and FIG. 3 again, in the present exemplary embodiment, the base 300 has a first geometric plane P1 which is parallel to the X-Y plane. A front projection of the first differential signal terminals 110 and 120 on the first geometric plane P1 is located between a front projection of the power terminal 230 and a front projection of the third differential signal terminals 210 and 220 on the first geometric plane P1. Additionally, a front projection of the second differential signal terminals 130 and 140 on the first geometric plane P1 is located between a front projection of the ground terminal 240 and the front projection of the third differential signal terminals 210 and 220 on the first geometric plane P1. The first terminal set 100 also includes a first ground terminal 150, wherein a front projection of the first ground terminal 150 on the first geometric plane P1 is located between the front projection of the third differential signal terminals 210 and 220 on the first geometric plane P1.

Accordingly, the above-mentioned terminals are arranged from the right side to the left side of FIG. 3 by the order of the power terminal 230, the first differential signal terminals 110 and 120, the third differential signal terminal 210, the first ground 150, the third differential signal terminal 220, the second differential signal terminals 130 and 140 and the second ground terminal 240, wherein the power terminal 230 and the third differential signal terminal 210 pass through from the two opposite sides of the first different signal terminals 110 and 120 and the second ground terminal 240 and the third differential signal terminal 220 pass through from the two opposite sides of the second different signal terminals 130 and 140.

It should be noted that a distance between the first differential signal terminals 110 and 120 is smaller than a distance between the first differential signal terminal 110 and the power terminal 230, and the distance between the first differential signal terminals 110 and 120 is also smaller than a distance between the third differential signal terminal 210 and the first differential signal terminal 120. On the other hand, a distance between the second differential signal terminals 130 and 140 is smaller than a distance between the second differential signal terminal 140 and the second ground terminal 240, and the distance between the second differential signal terminals 130 and 140 is also smaller than a distance between the third differential signal terminal 220 and the second differential signal terminal 130. Because the same differential signal terminal set has opposite polarity, a generated magnetic field thereof has an effect of eliminating magnetic force. And, when the same set of differential signal terminals are closer, the more magnetic forces are eliminated, and the less magnetic energies are released. Therefore, besides reducing the foregoing crosstalk interferences, the above-mentioned configuration further reduces electromagnetic interferences.

In other words, in order to make the USB connector 10 complied with the USB 3.0 standard to reduce interferences and suppress electromagnetic interferences during the transmission, besides shortening the distance between the first differential signal terminals 110 and 120 and the distance between the second differential signal terminals 130 and 140, a certain distance between the terminals of the second terminal set 220 and the first terminal set 100 should be kept.

Figure 5:
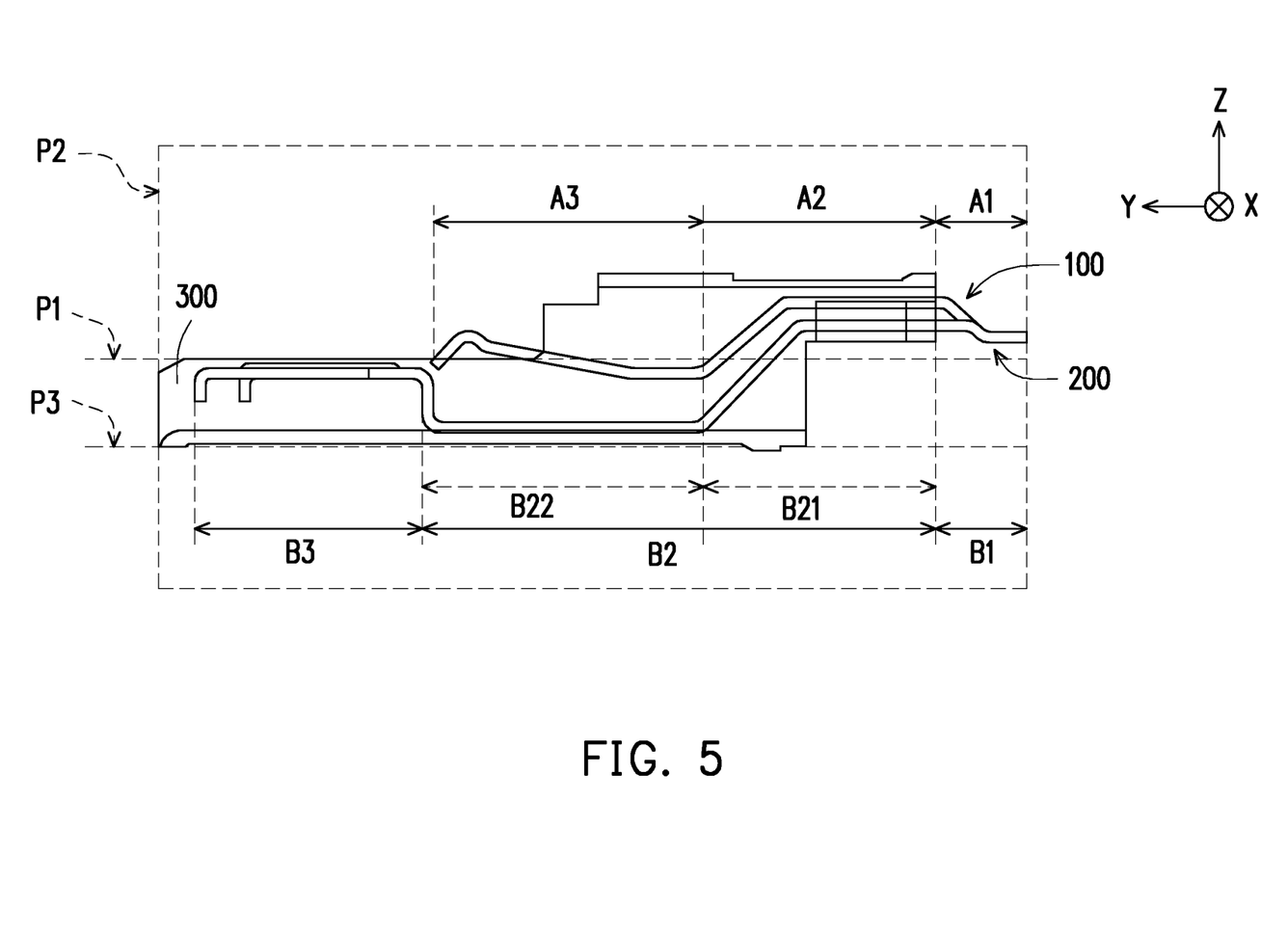
FIG. 5 is a side view of the USB connector depicted in FIG. 2.

FIG. 5 is a side view of the USB connector depicted in FIG. 2. Referring to FIG. 3 and FIG. 5, FIG. 3 shows the configuration of the first terminal set 100 and the second terminal set 200 on the first geometric plane P1, thereby ensuring the distance between the first differential signal terminals 110 and 120, the distance between the second differential signal terminals 130 and 140, and the suitable distances between the second terminal set 200 and the differential signal terminals 110, 120, 130 and 140.

On the other hand, on the second geometric plane P2, the second terminal set 200 of the present exemplary embodiment must be configured according to the structure shown in FIG. 5, such that the suitable distance between the second terminal set 200 and the first terminal set 100 can be kept.

Herein, the first geometric plane P1 is vertical to the second geometric plane P2, i.e., the second geometric plane P2 is parallel to the Y-Z plane.

In details, in the present exemplary embodiment, a front projection of the first differential signal terminals 110 and 120, a front projection of the second differential signal terminals 130 and 140 and a front projection of the first ground terminal 150 on the second geometric plane P2 are overlapped each other to form a pair of first end segments A1 and A3 and a first middle segment A2 connected between the first end segments A1 and A3, wherein the first end segments A1 and A3 are exposed from the base 300, the first middle segment A2 is located within the base 300 and the first middle segment A2 has a height difference descending contour related to the first end segments A1 and A3. Correspondingly, a front projection of the third differential signal terminals 210 and 220, a front projection of the power terminal 230 and a front projection of the second ground terminal 240 on the second geometric plane P2 form a pair of second end segments B1 and B3 and a second middle segment B2 connected between the second end segments B1 and B3, wherein the second end segments B1 and B3 are exposed from the base 300 and the second middle segment B2 is located within the base 300.

On the other hand, the terminals of the first terminal set 100 are arranged in parallel to each other and the terminals of the second terminal set 200 are arranged in parallel to each other. The detail configuration will be described with FIG. 5, i.e., one of the terminals of the first terminal set 100 and one of the terminals of the second terminal set 200 are described and taken as an example for representing other terminals.

In the present exemplary embodiment, in order to keep the suitable distance between the second terminal set 200 and the first terminal set 100, the second middle segment B2 has a height difference descending contour related to the second end segments B1 and B3. It should be noted that a portion B21 of the second middle segment B2 of the second terminal set 200, which is corresponding to the first middle segment A2 of the first terminal set 100, is located under the first middle segment A2, and another portion B22 of the second middle segment B2 of the second terminal set 200, which is corresponding to the first end segment A3 of the first terminal set 100, is located under the first end segment A3. Thus, the configuration of the first terminal set 100 and the second terminal set 200 within the base 300 may have height differences.

In other words, after extending into the base 300 from the second end segment B1, the second terminal set 200 first extends a distance in parallel to the Y axis and then extends facing the third geometric plane P3 of the base 300 (i.e., the second middle segment B2 substantially has a downward bend structure related to the second end segments B1 and B3), and therefore the portion B22 is substantially located at the third geometric plane P3 and until the second end segment B3, the second terminal set 200 is bended facing the first geometric plane P1 and exposed from the base 300. Herein, the bend between the second middle segment B2 and the second end segment B3 of the second terminal set 200 extends along with the Z axis, i.e., a portion between the second middle segment B2 and the second end segment B3 bends vertically.

Relatively, after extending into the base 300 from the first end segment A1, the first terminal set 100 extends in parallel to the Y axis, and then bends and extends facing the first geometric plane P1. The difference compared to the second terminal set 200 is that after entering into the base 300, the first terminal set 100 keeps a height differences related to the second terminal set 200 until the first end segment A3, thereby effectively reducing the crosstalk interferences.

Accordingly, the crosstalk interferences between the second terminal set 200 and the first terminal set 100 (in particular, the first differential signal terminals 110 and 120 and the second differential signal terminals 130 and 140) can be reduced by making the second terminal set 200 far away the first terminal set 100 on the Y-Z plane to increase the distance between the second terminal set and the first terminal set and further applying the configuration of the first terminal set 100 and the second terminal set 200 on the X-Y plane, as shown in FIG. 3.

Figure 6:
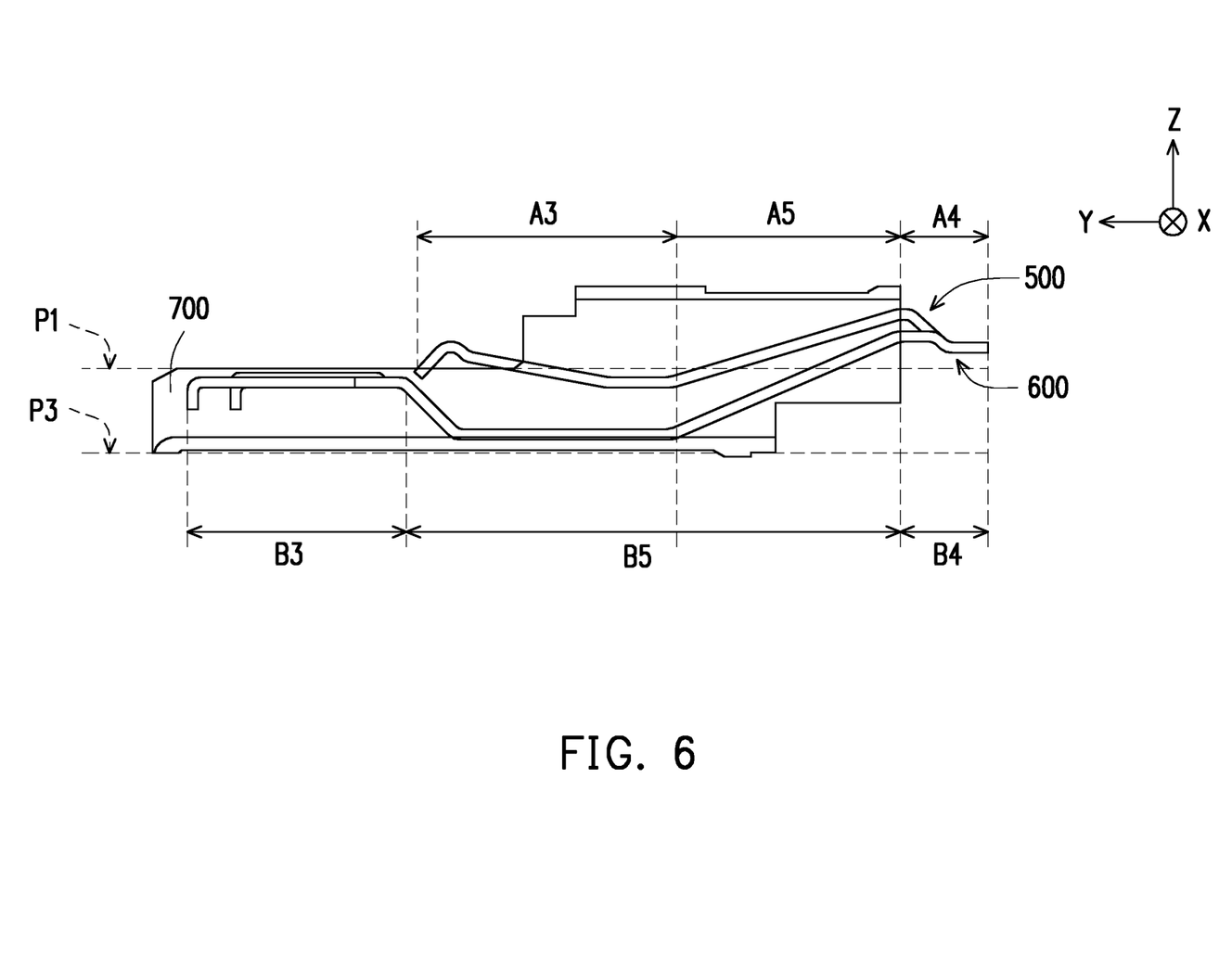
FIG. 6 is a side view of a USB connector in accordance with another exemplary embodiment of the present invention.

FIG. 6 is a side view of a USB connector in accordance with another exemplary embodiment of the present invention. The difference compared to the exemplary embodiment shown in FIG. 5 is that after entering the base 700, the first end segment A4 of the first terminal set 500 directly extends obliquely facing the first geometric plane P1 to form a first middle segment A5. Similarly, after entering the base 700, the second end segment B4 of the second terminal set 600 directly extends obliquely facing the third geometric plane P3 to form a second middle segment B5. The same as the exemplary embodiment shown in FIG. 5 is that the configuration of the first terminal set 500 and the second terminal set 600 within the base 700 still has a height differences. Additionally, the second end segment B5 of the second terminal set 600 directly extends obliquely to the first geometric plane P1 from the third geometric plane P3 to form the second end segment B3 on the first geometric plane P1. In other words, the first end segment A4 and the second end segment B4, which are entering the base 700, extends facing the third geometric plane P3 and pass through the first geometric plane P1 to form the first middle segment A5 and the second middle segment B5.

Referring to FIG. 3 and FIG. 5, additionally, in the present exemplary embodiment, the power terminal 230 and the second ground terminal set 240 of the second terminal set 200 are disposed on the rightmost and the leftmost of FIG. 3. That is, the power terminal 230 is adjacent to a sidewall 410 of the housing 400 and the second ground terminal 240 is adjacent to a sidewall 420 of the housing 400, wherein the sidewall 410 is opposite to the side wall 420 and the sidewalls 410 and 420 are isolated each other by the base 300. However, in order to make the first terminal set and the second terminal set to comply with the USB 3.0 standard, the second end segment B3 of the power terminal 230 and the second end segment B3 of the second ground terminal 240 may both bend.

To be specific, the front projection of the second end segment B31 of the power terminal 230 on the first geometric plane P1 is bended at a side of the first differential signal terminal 110 (i.e., between the first differential signal terminal 110 and the sidewall 410) and then bended facing the central of the first differential signal terminals 110 and 120, and the front projection of the second end segment B32 of the second ground 240 on the first geometric plane P is bended at a side of the second differential signal terminal 140 (i.e., between the second differential signal terminal 140 and the sidewall 420) and then bended facing the central of the second differential signal terminals 130 and 140. In other words, the power terminal 230 and the second ground terminal 240 of the present exemplary embodiment respectively have gold finger structures which are exposed from the base 300 and respectively protruded and bended facing the sidewalls 410 and 420 of the base 300. Therefore, the end segment A3 of the first terminal set 100 and the end segment B3 the second terminal set may comply with the USB 3.0 standard while effectively reducing the crosstalk and electromagnetic interferences due to the high-speed transmission.

As described above, in the exemplary embodiments of the present invention, the first differential signal terminals of the first terminal set are adjacent to each other, and the second differential signal terminals are adjacent to each other, the terminals of the second terminal set pass from the left side and the right side of the first differential signal terminals and from the left side and the right side of the second differential signal terminals. Therefore, the coupling level between the first differential signal terminals (and the second differential signal terminals) may be increased. Accordingly, external noises only be coupled to the pair of first differential signal terminals (or the pair of second differential signal terminals) and not affect the signal difference. Furthermore, the polarities of the first differential signal terminals are different (or the second differential signal terminals), and therefore the generated electromagnetic fields are eliminated by each other, thereby reducing the electromagnetic interferences. The previously described exemplary embodiments of the present invention have the advantages aforementioned, wherein the advantages aforementioned not required in all versions of the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A universal series bus connector, wherein the universal series bus connector has a first end and a second end, comprising:

a base;

a first terminal set, comprising a first ground terminal, a pair of first differential signal terminals and a pair of second differential signal terminals respectively disposed on the base, wherein, from the first end to the second end, terminals of the pair of first differential signal terminals are adjacent to each other and terminals of the pair of second differential signal terminals are adjacent to each other; and a second terminal set, comprising a pair of third differential signal terminals, a power terminal and a second ground terminal respectively disposed on the base, wherein the first terminal set and the second terminal set are arranged by order of the power terminal, the pair of first differential signal terminals, one of the terminal of the pair of third differential signal terminals, the first ground terminal, the other terminal of the pair of third differential signal terminals, the second differential signal terminals and the second ground terminal and adjacent to each other, wherein the power terminal and one of the terminal of the pair of third differential signal terminals of the second terminal set are located respectively at two opposite sides of the pair of first differential signal terminals, and the other terminal of the pair of third differential signal terminals and the second ground terminal of the second terminal set are located respectively at two opposite sides of the pair of second differential signal terminals.

2. The universal series bus connector according to claim 1, wherein the pair of first differential signal terminals are a transmitter differential pair (TX+/TX−) or a receiver differential pair (RX+/RX−), the pair of second differential signal terminals are a receiver differential pair (RX+/RX−) or a transmitter differential pair (TX+/TX−), wherein the second terminal set is a terminal set based on a universal series bus 2.0.

3. The universal series bus connector according to claim 2, wherein a distance between the pair of first differential signal terminals is smaller than a distance between the pair of first differential signal terminal and the power terminal, and the distance between the pair of first differential signal terminals is also smaller than a distance between the pair of third differential signal terminals and the pair of first differential signal terminals.

4. The universal series bus connector according to claim 2, wherein a distance between the pair of second differential signal terminals is smaller than a distance between the pair of second differential signal terminal and the second ground terminal, and the distance between the pair of second differential signal terminals is also smaller than a distance between the pair of third differential signal terminals and the pair of second differential signal terminals.

5. The universal series bus connector according to claim 2, wherein the base has a first geometric plane, an orthogonal projection of the pair of first differential signal terminals on the first geometric plane is located between an orthogonal projection of the power terminal and an orthogonal projection of the pair of third differential signal terminals on the first geometric plane, and an orthogonal projection of the pair of second differential signal terminals on the first geometric plane is located between an orthogonal projection of the second ground terminal and the orthogonal projection of the pair of third differential signal terminals on the first geometric plane.

6. The universal series bus connector according to claim 5, wherein an orthogonal projection of the first ground terminal on the first geometric plane is located between the orthogonal projection of the pair of third differential signal terminals on the first geometric plane.

7. The universal series bus connector according to claim 5, wherein the base has a second geometric plane, and the second geometric plane is vertical to the first geometric plane, wherein an orthogonal projection of the pair of first differential signal terminals, an orthogonal projection of the pair of second differential signal terminals and an orthogonal projection of the first ground terminal on the second geometric plane are overlapped each other to form a pair of first end segments and a first middle segment connected between the pair of first end segments, wherein the pair of first end segments are exposed from the base, and the first middle segment is located within the base.

8. The universal series bus connector according to claim 7, wherein an orthogonal projection of the pair of third differential signal terminals, an orthogonal projection of the power terminal and an orthogonal projection of the second ground terminal on the second geometric plane form a pair of second end segments and a second middle segment connected between the pair of second end segments, wherein the pair of second end segments are exposed from the base and the second middle segment is located within the base, wherein a portion of the second middle segment corresponding to the first middle segment is located under the first middle segment, and another portion of the second middle segment corresponding to one of the first end segments is located under the one of the first end segments.

9. The universal series bus connector according to claim 8, wherein the second middle segment has a height differences descending contour related to the second end segment.

10. The universal series bus connector according to claim 8, wherein an orthogonal projection of one of the second end segments of the power terminal on the first geometric plane is bended at a side of the pair of first differential signal terminals and then bended facing a central of the pair of first differential signal terminals, and an orthogonal projection of one of the second end segments of the second ground terminal on the first geometric plane is bended at a side of the pair of second differential signal terminals and then bended facing a central of the pair of second differential signal terminals.

11. The universal series bus connector according to claim 10, wherein the orthogonal projection of one of the second end segments of the power terminal on the first geometric plane is bended and exposed from the base at a side of the pair of first differential signal terminals, and the orthogonal projection of one of the second end segments of the second ground terminal on the first geometric plane is bended and exposed from the base at a side of the pair of second differential signal terminals.

12. The universal series bus connector according to claim 8, wherein the base further has a third geometric plane, and the third geometric plane is parallel to the first geometric plane and under the first geometric plane, wherein after entering the base, one of the first end segments and one of the second end segments extends a distance along a direction of the first geometric plane, and then bend and extend facing the third geometric plane.

13. The universal series bus connector according to claim 8, wherein the base further has a third geometric plane, and the third geometric plane is parallel to the first geometric plane and under the first geometric plane, wherein after entering the base, one of the first end segments and one of the second end segments extends facing the third geometric plane and pass through the first geometric plane.

14. The universal series bus connector according to claim 7, wherein the first middle segment has a height differences descending contour related to the pair of the first end segments.

* * * * *